(12) United States Patent
Parker

(10) Patent No.: US 10,111,310 B2
(45) Date of Patent: Oct. 23, 2018

(54) METHOD AND MEANS FOR REMOVING STATIC ELECTRICITY FROM WATER

(71) Applicant: Steven E. Sneller, Harrisburg, SD (US)

(72) Inventor: William R. Parker, Idaho Falls, ID (US)

(73) Assignee: Steven E. Sneller, Harrisburg, SD (US)

( * ) Notice: Subject to any disclaimer, the term of this patent is extended or adjusted under 35 U.S.C. 154(b) by 274 days.

(21) Appl. No.: 15/085,769

(22) Filed: Mar. 30, 2016

(65) Prior Publication Data

US 2017/0290133 A1    Oct. 5, 2017

(51) Int. Cl.
*H05F 3/02*    (2006.01)
*F16L 55/07*    (2006.01)

(52) U.S. Cl.
CPC ............... *H05F 3/02* (2013.01); *F16L 55/07* (2013.01)

(58) Field of Classification Search
CPC .................................. H05F 3/02; F16L 55/07
See application file for complete search history.

(56) References Cited

U.S. PATENT DOCUMENTS

| | | | | |
|---|---|---|---|---|
| 1,988,816 | A | * | 1/1935 | Smith ................. H05F 3/02 361/215 |
| 5,754,388 | A | * | 5/1998 | Schmidt ............. H05F 3/02 361/215 |
| 6,017,064 | A | * | 1/2000 | Harrington ........ F16L 41/08 285/21.3 |
| 2003/0192713 | A1 | * | 10/2003 | Orsini ................. H01R 4/66 174/7 |

\* cited by examiner

*Primary Examiner* — Scott Bauer
(74) *Attorney, Agent, or Firm* — McKee, Voorhees & Sease, PLC

(57) ABSTRACT

A water treatment device is provided to remove static or stray electricity from water. The device includes a pipe though which the water flows, with an electrical coil within the pipe. The coil captures or collects the electricity and transmits electricity to ground via a ground wire.

12 Claims, 1 Drawing Sheet

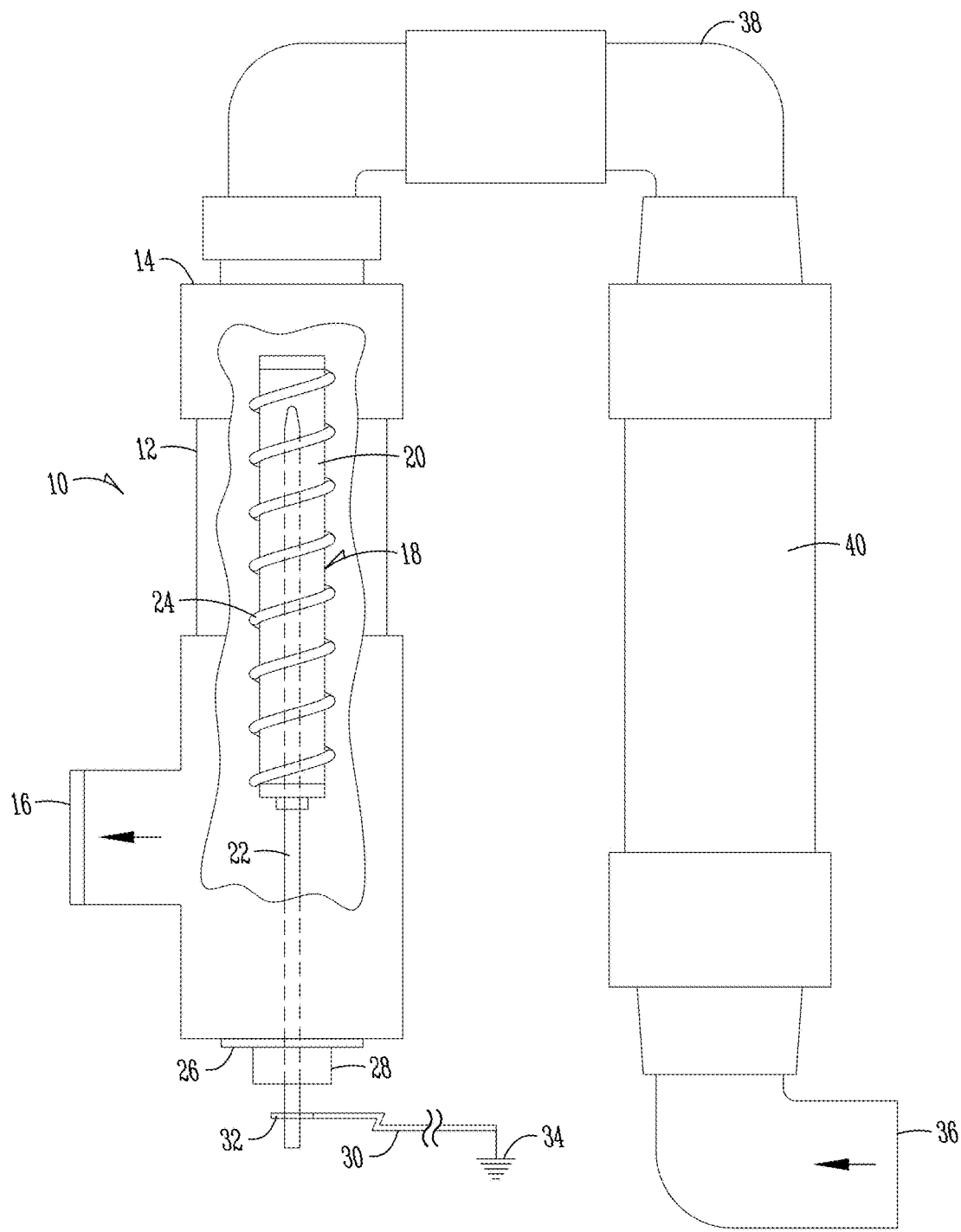

METHOD AND MEANS FOR REMOVING STATIC ELECTRICITY FROM WATER

BACKGROUND OF THE INVENTION

Water is a well-known conductor of electricity. Water also retains excess electrons that create static or stray electricity, which often can be measured in a range of 10-400, or more, millivolts. This stray electricity is detrimental to many, if not most water applications, including livestock watering, crop irrigation, and other uses for plants, animals, and humans wherein cellular metabolism affects biological events.

Therefore, a primary objective of the present invention is the provision of a means and method for removing electricity from water.

Another objective of the present invention is the provision of a device for collecting stray electricity in water and for transferring the collected electricity to ground.

A further objection of the present invention is a provision of a water treatment device through which water flows such that static electricity is removed from the water.

Still another objective of the present invention is the provision of a method of removing static electricity from water.

Yet another objective of the present invention is the provision of a method of treating water so as to yield approximately zero millivolts of electricity in the water.

A further objective of the present invention is the provision of a method and means for removing electricity from water which is economical and safe.

These and other objectives will become apparent from the following description of the invention.

SUMMARY OF THE INVENTION

A water treatment device is provided to remove electricity from water. The device includes a pipe through which the water flows. An electrical coil within the pipe collects static or stray electrical voltage, which is then directed through a ground wire connected to the coil to a remote ground location. With the electricity removal device, the method passively and continuously operates to produce water free from stray electricity.

DESCRIPTION OF THE DRAWINGS

FIG. 1 is a schematic view of one embodiment of the water treatment device for removing electricity, according to the present invention.

DETAILED DESCRIPTION OF THE INVENTION

The present invention is directed towards a device for treating water so as to remove static or stray electricity from the water. The device is generally designated by the reference numeral 10 in FIG. 1. The device 10 may be used in conjunction with a second water treatment device 40, which functions to oxidize detrimental contaminants in the water. The device 40 is described in patent application Ser. No. 62/126,741, entitled "Water Treatment Device", filed on Mar. 2, 2015 in the names of inventors Anthony Gutierrez, Faye Cox-Gutierrez, James Downing, and Verlyn Sneller, which is incorporated herein by reference.

The electricity removal device 10 includes a pipe 12 through which water flows from an inlet 14 to an outlet 16. The outlet 16 can be connected to another pipe (not shown) for delivery of the treated water for any desired use or application.

An electrical coil 18 is mounted within the pipe 12. More particularly, the coil includes a metal core 20, such as a steel bar, mounted on a rod or mounting hardware 22 so as to be supported in the pipe 12. As seen in FIG. 1, the coil 20 preferably extends axially within the pipe 12. An electrically conductive wire 24 is spirally wrapped around the core 20 so as to form the coil 18. In FIG. 1, the wire 24 is illustrated with spacing between the spiral sections, though it is understood that the wire 24 can be wrapped closely and tightly on the core 20, with little if any spacing between the coil wire revolutions.

The mounting bracket or rod 22 has a threaded end extending out of the pipe 12, and is secured by a washer 26 and a nut 28. A grounding wire 30 is connected to the end of the rod 22, such as by a grounding nut 32, and extends to a ground source 34, such as a grounding stake or post inserted into the earth.

In operation, water enters an inlet 36 for the treatment device 40, and then exits into a conduit 38, which in turn is connected to the inlet 14 of the pipe 12. The water then passes through the pipe 12 wherein the stray electrical voltage is collected by the core 20 of coil 18 before the water exits the outlet 16. The collected electricity is transferred or transmitted by the ground wire 30 to the ground 34.

Preliminary tests of treating water with the device 10 for livestock consumption have shown beneficial results. In one pig farming trial, use of the electricity removal device 10 increased water intake by the pigs by approximately 20-30%, over and above a 20-25% increase when using the treatment device 40 by itself. The pigs look better, are more even in size, and have more energy. There is less sickness and death loss. The pigs require less chemicals and medicine. The pigs who drink water from the treatment system 10 and 40 have better feed conversion, with less feed required to achieve the desired kill weight. Grow out to kill weight is also faster using the water treatment device 10. Generally, the pigs are in all-around better health drinking water that has been treated to remove electricity.

In a second pig farming test, two barns were used, with 1,000 nursery feeder pigs contained in each barn. An electron removal device 10 was used in combination with the treatment device 40 in the first barn, while the second barn used neither device. When the water treatment system was installed, the nursery pigs were one month into the two month term. Each barn had separate water meters. Within two hours after the system was installed in the first barn, the water meter for the first barn showed more water activity than in the second barn. In the first week, water consumption in the first barn was consistently 20-30% more than in the second barn. After the first week, the ground wire 30 for the treatment system of the first barn was unhooked for two days so that electricity was not being transferred from the coil to the ground, which resulted in a 15% decrease in water consumption. When the ground wire 30 was reconnected, water usage again increased by 30% over the untreated water usage in the second barn. At the end of the third week, a visual inspection of the pigs showed that body size, alertness, and general spunkiness were greater for the animals in the treated barn. Also, the eyes of the pigs in the first barn were more prominent and clear, than the eyes of the pigs in the second barn, which were sunken, bloodshot, or draining. This improved condition of the pigs' eyes is a good sign of proper hydration, as compared to the dehydrated condition of the pigs in the second barn. Each of the barns also had their own manure and urine pits, which were measured before and after the tests. After 30 days, the pits of both barns had risen the same level, indicating that the pigs in the first barn, who consumed approximately 30% more water than the pigs in the second barn, had metabolized the extra water, which confirms the improved overall condition of the pigs in the first barn. During this test, the device 10 measured 175 millivolts of removed electricity.

The water treatment device 10 can be used alone, or in combination with the treatment device 40. Water treated by the device 10 to remove electricity can be used in numerous and unlimited applications, such as live stock and animal watering, crop irrigation, hydroponics, aquaponics, green house watering, dairy operations, natural and made man water ponds, lakes, pools, lagoons, waste pits, and sanitization systems, desalination, commercial and residential usage for human consumption and for cleaning purposes, meat and plant processing, ethanol production, medical cleansing and sterilization, oil separation, fracking, chemical reactors and processors, and other uses and applications were untreated water has previously been utilized.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A device for removing static electricity from water comprising:
   a pipe through which water flows;
   an electrical energy collector in the pipe and the electrical energy collector including a steel core and an electrical wire wrapped around the steel core;
   a grounding wire extending from the electrical energy collector to an earth ground so as to transfer electricity from the water to the earth.

2. The device of claim 1 wherein the steel core has a coating to inhibit rust.

3. The device of claim 2 wherein the coating is copper.

4. The device of claim 1 wherein the electrical energy collector extends longitudinally within the pipe.

5. The device of claim 1 wherein the coil is coated with metal.

6. The device of claim 1 wherein the pipe is PVC.

7. The device of claim 1 wherein the pipe is plastic.

8. The device of claim 1 wherein the electrical energy collector removes up to at least 400 millivolts of electricity from the water.

9. A water treatment device, comprising:
   a pipe through which water passes;
   an electrical coil in the pipe to collect stray electrical voltage;
   the electrical coil including steel core wrapped with electrical wire;
   a ground wire connected to the coil and extending to a remote location;
   whereby stray electrical voltage is collected by the coil and removed from the water via the ground wire.

10. The water treatment device of claim 9 wherein the steel core is coated to inhibit rusting.

11. The water treatment device of claim 9 wherein the coil removes stray electrical voltage passively and continuously from the water.

12. The water treatment device of claim 9 wherein the pipe is plastic.

* * * * *